(12) United States Patent
Shinn et al.

(10) Patent No.: US 8,482,712 B2
(45) Date of Patent: Jul. 9, 2013

(54) FLEXIBLE ELECTRONIC PAPER DISPLAY APPARATUS AND MANUFACTURING METHOD THEREOF

(75) Inventors: Ted-Hong Shinn, Hsinchu (TW); Wen-Chung Tang, Hsinchu (TW); Yao-Chou Tsai, Hsinchu (TW); Fang-An Shu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 114 days.

(21) Appl. No.: 13/085,257

(22) Filed: Apr. 12, 2011

(65) Prior Publication Data
US 2012/0162583 A1   Jun. 28, 2012

(30) Foreign Application Priority Data
Dec. 28, 2010   (TW) ............................ 99146400 A

(51) Int. Cl.
*G02F 1/1333*   (2006.01)
(52) U.S. Cl.
USPC ....................................................... 349/158
(58) Field of Classification Search
USPC ........................................................ 349/158
See application file for complete search history.

(56) References Cited

U.S. PATENT DOCUMENTS

| 2009/0021678 A1* | 1/2009 | Son et al. ................ 349/122 |
| 2011/0204361 A1* | 8/2011 | Nishiki et al. .............. 257/52 |

* cited by examiner

*Primary Examiner* — Wen-Ying P Chen
(74) *Attorney, Agent, or Firm* — WPAT, PC; Justin King

(57) ABSTRACT

A flexible electronic paper display apparatus includes a drive substrate and a display layer. The display layer is disposed on the drive substrate. The drive substrate includes a plastic substrate, a stainless steel layer, an insulation layer and a circuit unit. The stainless steel layer is disposed on the plastic substrate, the insulation layer is disposed on the stainless steel layer, and the circuit unit is disposed on the insulation layer. Production yield of the flexible electronic paper display apparatus can be increased. Additionally, a manufacturing method for the flexible electronic paper display apparatus is also provided.

14 Claims, 5 Drawing Sheets

FLEXIBLE ELECTRONIC PAPER DISPLAY APPARATUS AND MANUFACTURING METHOD THEREOF

FIELD OF THE INVENTION

The present invention relates to a display apparatus and a manufacturing method thereof, and more particularly to a flexible electronic paper display apparatus and a manufacturing method thereof.

BACKGROUND OF THE INVENTION

With rapid progress and development of display technology, the liquid crystal display apparatus, which has advantages of high display quality, efficient use of space and low radiation, becomes mainstream of the market. However, under the circumstance that environmental protection is gradually paid more attention, the electronic paper display apparatus becomes more and more popular because the electronic paper display apparatus has lower power consumption than the liquid crystal display apparatus.

FIGS. 1A to 1C are flow charts showing a manufacturing method of a conventional flexible electronic paper display apparatus. Referring to FIG. 1A, in a conventional technology, a plastic substrate 120 is formed on a glass substrate 110. After that, a thin film transistor array 130 is manufactured on the plastic substrate 120. And then, as shown in FIG. 1B, a display layer 140 is disposed on the thin film transistor array 130. Then, as shown in FIG. 1C, a laser lift-off process is performed so as to separate the plastic substrate 120 and the glass substrate 110, such that a flexible electronic paper display apparatus 100 is obtained.

However, since the plastic substrate 120 is flexible, in the laser lift-off process, residual stress is generated because of temperature and other factors, and thereby the plastic substrate 120 is distorted and even a part of the thin film transistor array 130 may be damaged. Moreover, because the plastic substrate 120 is too soft, the flexible electronic paper display apparatus 100 will be damaged in following reliability test process. Therefore, the conventional flexible electronic paper display apparatus 100 has low production yield and reliability.

SUMMARY OF THE INVENTION

The present invention provides a flexible electronic paper display apparatus so as to promote production yield.

The present invention also provides a manufacturing method of flexible electronic paper display apparatus which can promote production yield.

To achieve the above-mentioned advantages, the present invention provides a flexible electronic paper display apparatus including a drive substrate and a display layer. The display layer is disposed on the drive substrate. The drive substrate includes a plastic substrate, a stainless steel layer, an insulation layer and a circuit unit. The stainless steel layer is disposed on the plastic substrate, the insulation layer is disposed on the stainless steel layer, and the circuit unit is disposed on the insulation layer.

In one embodiment of the present invention, the flexible electronic paper display apparatus further includes at least one adhesive layer disposed between the plastic substrate and the stainless steel layer and/or disposed between the stainless steel layer and the insulation layer.

In one embodiment of the present invention, the display layer is an electrophoretic layer, an electro-wetting layer, a quick response liquid powder display layer, or a cholesteric liquid crystal layer.

In one embodiment of the present invention, the flexible electronic paper display apparatus further includes a protecting layer disposed on the display layer.

In one embodiment of the present invention, the flexible electronic paper display apparatus further includes a color filter disposed on the display layer. Moreover, the flexible electronic paper display apparatus, for example, further includes a protecting layer disposed on the color filter.

In one embodiment of the present invention, the circuit unit includes an active element array.

The present invention also provides a manufacturing method of flexible electronic paper display apparatus including following steps. Firstly, a plastic substrate is formed on a rigid substrate, and then, a stainless steel layer is formed on the plastic substrate. After that, an insulation layer is formed on the stainless steel layer, and then a circuit unit is formed on the insulation layer. Then, a display layer is disposed on the circuit unit. After that, the rigid substrate and the plastic substrate are separated.

In one embodiment of the present invention, an area of a bearing surface of the rigid substrate is larger than an area of a bearing surface of the stainless steel layer.

In one embodiment of the present invention, the stainless steel layer is adhered to the plastic substrate.

In one embodiment of the present invention, the insulation layer is adhered to the stainless steel layer.

In one embodiment of the present invention, the manufacturing method of flexible electronic paper display apparatus further includes disposing a protecting layer on the display layer before separating the rigid substrate and the plastic substrate.

In one embodiment of the present invention, the manufacturing method of flexible electronic paper display apparatus further includes disposing a color filter on the display layer before separating the rigid substrate and the plastic substrate. Moreover, the manufacturing method of flexible electronic paper display apparatus may further include disposing a protecting layer on the color filter before separating the rigid substrate and the plastic substrate.

In the flexible electronic paper display apparatus and the manufacturing method thereof of the present invention, the stainless steel layer is designed to reduce distortion of the plastic substrate caused by residual stress, and thereby components of the flexible electronic paper display apparatus can be prevented from being damaged. Moreover, the stainless steel layer is designed to further prevent the flexible electronic paper display apparatus from being damaged in reliability test. Therefore, the flexible electronic paper display apparatus and the manufacturing method thereof can promote production yield and reliability of the flexible electronic paper display apparatus.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
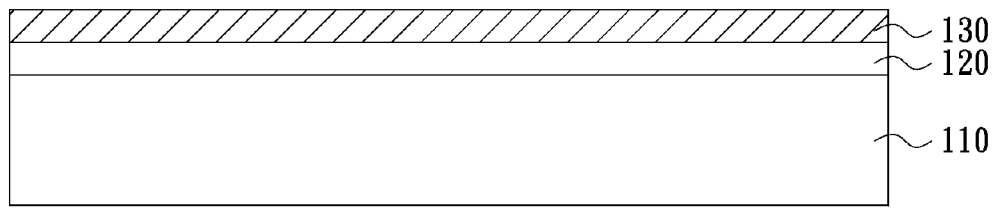
FIGS. 1A to 1C are flow charts showing a manufacturing method of a conventional flexible electronic paper display apparatus.
Figure 1B:
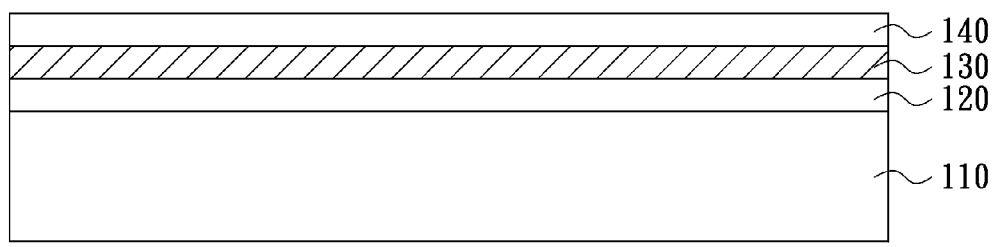
Figure 1C:
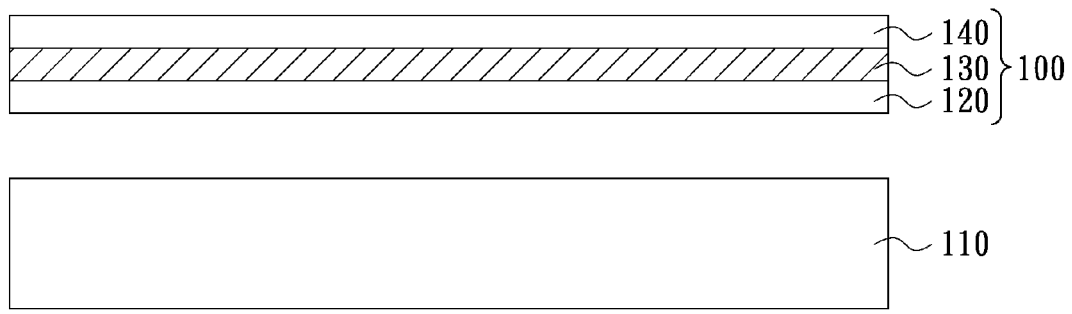
Figure 2A:
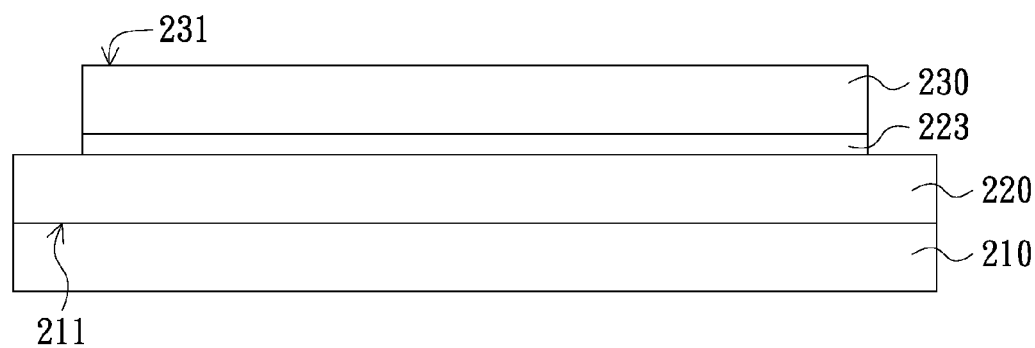
FIGS. 2A to 2D are flow charts showing a manufacturing method of a flexible electronic paper display apparatus according to an embodiment of the present invention.

FIGS. 2A to 2D are flow charts showing a manufacturing method of a flexible electronic paper display apparatus according to an embodiment of the present invention. Referring to FIG. 2A, a manufacturing method of a flexible electronic paper display apparatus of the present embodiment includes the following steps. Firstly, a plastic substrate 220 is formed on a rigid substrate 210, and then, a stainless steel layer 230 is formed on the plastic substrate 220. A method for forming the plastic substrate 220, for example, includes coating a thermoset plastic on the rigid substrate 210, and then solidifying the thermoset plastic by heating so as to form the plastic substrate 220. Material of the thermoset plastic is, for example, but not limited to, polyimide. Additionally, the stainless steel layer 230 is, for example, adhered to the plastic substrate 220 via an adhesive layer 223 disposed between the stainless steel layer 230 and the plastic substrate 220. The stainless steel layer 230 is a foil. In an embodiment, a thickness of the plastic substrate 220 or the stainless steel layer 230 is, for example, ranged from about tens of microns to hundreds of microns. Furthermore, an area of a bearing surface 231 of the stainless steel layer 230 is, for example, smaller than an area of a bearing surface 211 of the rigid substrate 210. In such way, a region of the rigid substrate 210 which is not overlapped by the stainless steel layer 230 can be configured to form alignment marks which are used for alignment in following process.

Figure 2B:
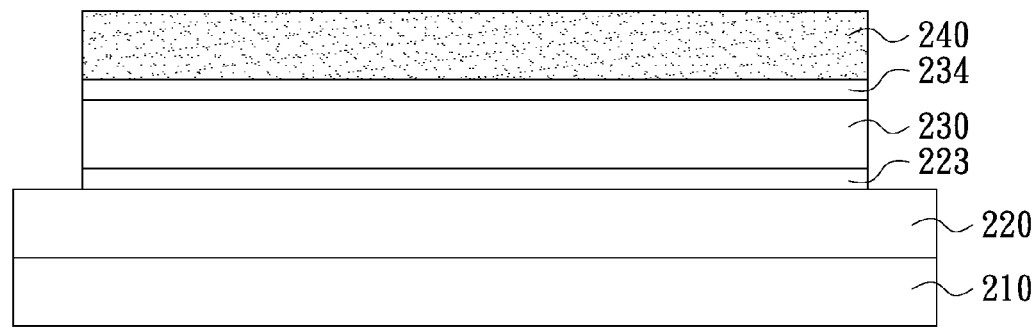

After that, as shown in FIG. 2B, an insulation layer 240 is formed on the stainless steel layer 230. The insulation layer 240 is, for example, adhered to the stainless steel layer 230 via an adhesive layer 234 disposed between the stainless steel layer 230 and the insulation layer 240. Material of the insulation layer 240 can be silicon nitride, silicon oxide or other plastic. In another embodiment, the insulation layer can be formed by silicon nitride or silicon oxide coated on the stainless steel layer 230.

Figure 2C:
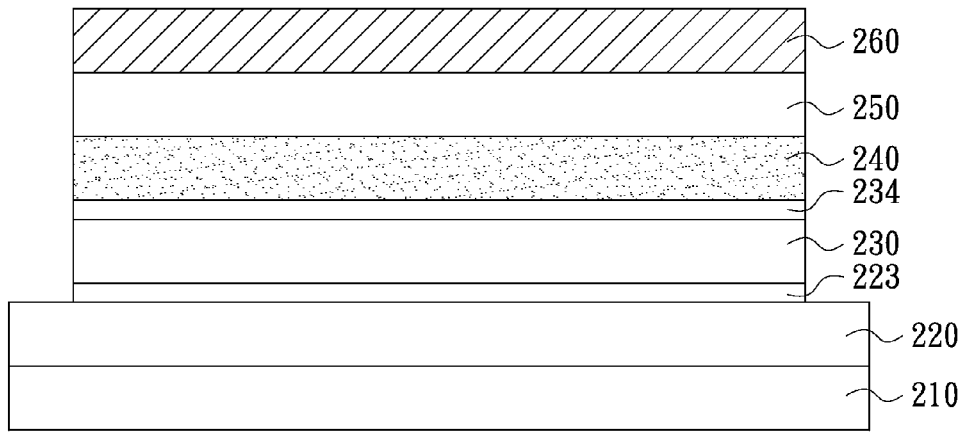

Next, as shown in FIG. 2C, a circuit unit 250 is formed on the insulation layer 240, and then, a display layer 260 is disposed on the circuit unit 250. The circuit unit 250, for example, includes an active element array (such as a thin film transistor array) and a peripheral circuit. In other embodiments, the circuit unit 250 can include a passive element array and a peripheral circuit. Furthermore, the display layer 260 is, for example, an electrophoretic layer, an electro-wetting layer, a quick response liquid powder display layer, a choles-teric liquid crystal layer or other suitable display layer according to design requirements.

Figure 2D:
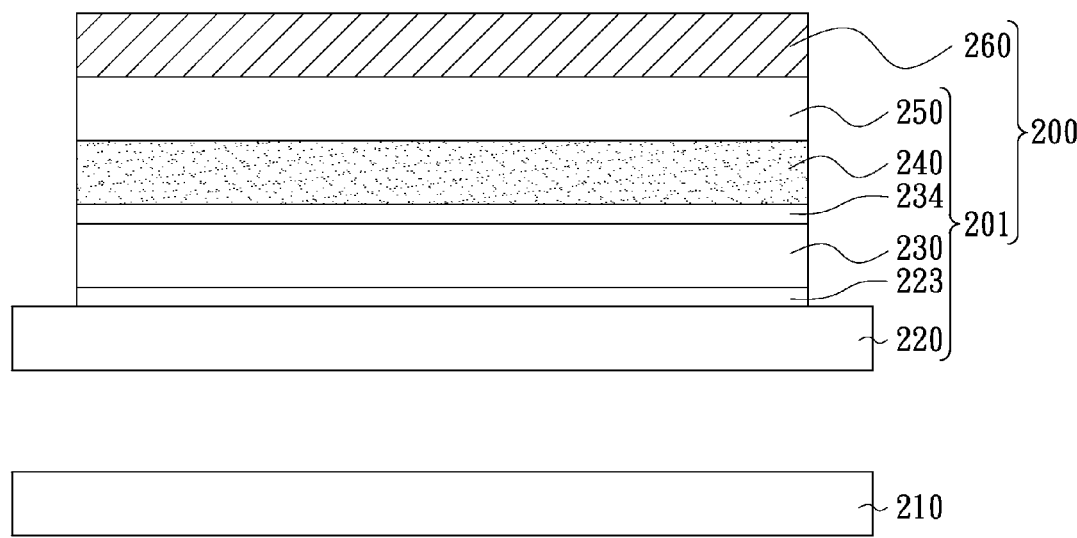

After that, as shown in FIG. 2D, the rigid substrate 210 and the plastic substrate 220 are separated so as to obtain a flexible electronic paper display apparatus 200. A method for separating the rigid substrate 210 and the plastic substrate 220 can adopt, but not limited to, a laser lift-off process. Furthermore, the flexible electronic paper display apparatus 200 manufactured by the above-mentioned manufacturing method includes a drive substrate 201 and the display layer 260. The display layer 260 is disposed on the drive substrate 201. The drive substrate 201 includes the plastic substrate 220, the stainless steel layer 230, the insulation layer 240 and the circuit unit 250. The stainless steel layer 230 is disposed on the plastic substrate 220, the insulation layer 240 is disposed on the stainless steel layer 230, and the circuit unit 250 is disposed on the insulation layer 240.

In the manufacturing method of the flexible electronic paper display apparatus of the present embodiment, since the plastic substrate 220 is disposed on the stainless steel layer 230, the plastic substrate 220 and the stainless steel layer 230 constitute a bearing base, and the bearing base has flexibility but is not too soft. When the rigid substrate 210 and the plastic substrate 220 are separated, distortion of the plastic substrate 220 can be reduced, and thereby components of the flexible electronic paper display apparatus 200 can be effectively prevented from being damaged. Additionally, because of the configuration of the stainless steel layer 230, when reliability of the flexible electronic paper display apparatus 200 is tested in the following process, the flexible electronic paper display apparatus 200 can be prevented from being damaged. Furthermore, the flexible electronic paper display apparatus 200 manufactured by the manufacturing method of the present embodiment has better production yield and reliability.

Figure 3:
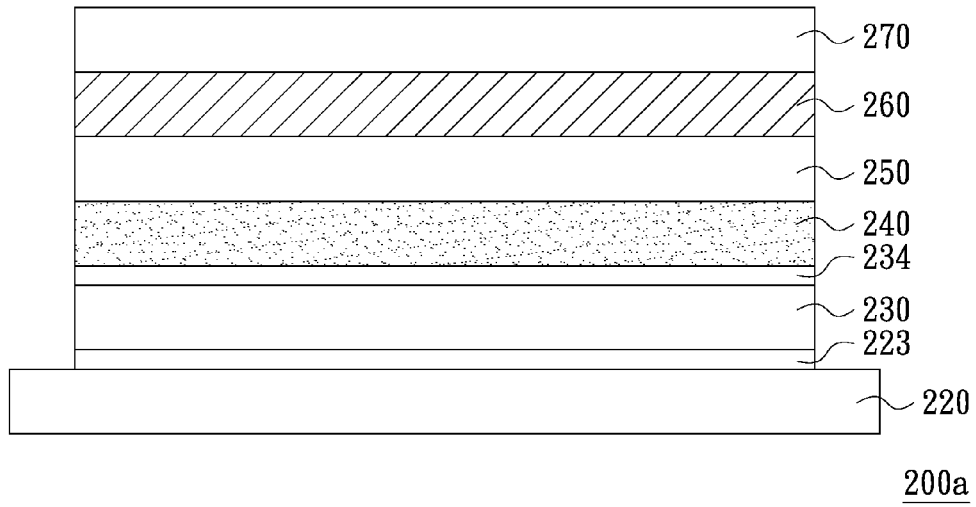
FIG. 3 is a schematic view of a flexible electronic paper display apparatus according to another embodiment of the present invention.

FIG. 3 is a schematic view of a flexible electronic paper display apparatus according to another embodiment of the present invention. Referring to FIG. 3, compared with the flexible electronic paper display apparatus 200 of FIG. 2D, a flexible electronic paper display apparatus 200a of the present embodiment further includes a protecting layer 270 disposed on the display layer 260. More specifically, when the flexible electronic paper display apparatus 200a is manufactured, the protecting layer 270 is disposed on the display layer 260 before the step of separating the rigid substrate and the plastic substrate 220. After that, the rigid substrate and the plastic substrate 220 are separated so as to obtain the flexible electronic paper display apparatus 200a.

Figure 4:
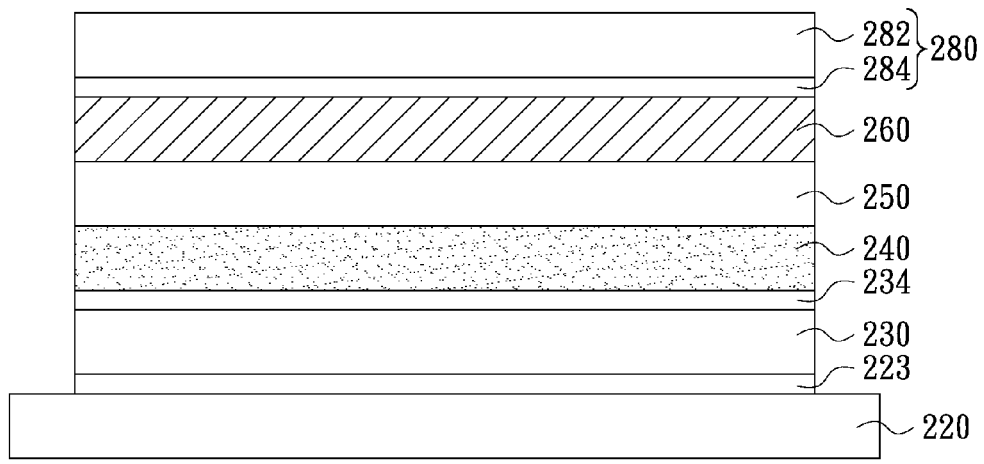
FIG. 4 is a schematic view of a flexible electronic paper display apparatus according to another embodiment of the present invention.

FIG. 4 is a schematic view of a flexible electronic paper display apparatus according to another embodiment of the present invention. Referring to FIG. 4, compared with the flexible electronic paper display apparatus 200 of FIG. 2D, a flexible electronic paper display apparatus 200b of the present embodiment further includes a color filter 280 disposed on the display layer 260. More specifically, when the flexible electronic paper display apparatus 200b is manufactured, the color filter 280 is disposed on the display layer 260 before the step of separating the rigid substrate and the plastic substrate 220. After that, the rigid substrate and the plastic substrate 220 are separated so as to obtain the flexible electronic paper display apparatus 200b. The color filter 280 may include a glass substrate 282 and a color photo-resist layer 284 formed on the glass substrate 282.

Figure 5:
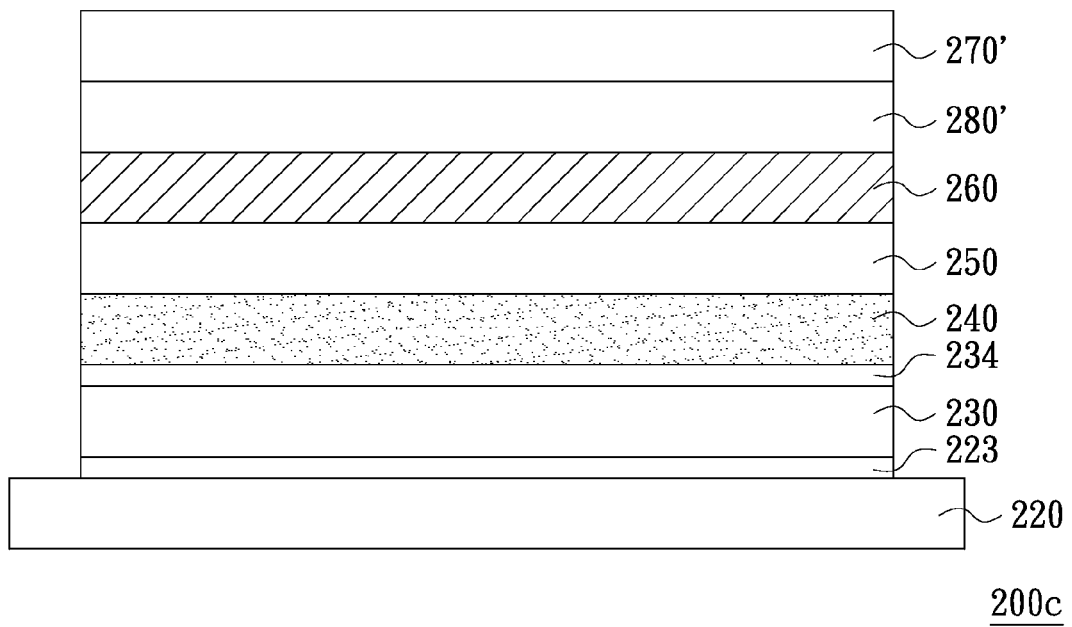
FIG. 5 is a schematic view of a flexible electronic paper display apparatus according to another embodiment of the present invention.

It should be noted that, as shown in FIG. 5, if a color filter 280' adopts other transparent substrate with thin thickness to replace the glass substrate, the rigid substrate and the plastic substrate 220 are separated after a protecting layer 270' is disposed on the color filter 280'. Color photo-resists of the color filter 280' are, for example, formed by laser thermal transfer method or inkjet printing method.

In summary, in the flexible electronic paper display apparatus and the manufacturing method thereof of the present invention, since the bearing base constituted by the plastic substrate and the stainless steel layer has flexibility but is not too soft, distortion of the plastic substrate caused by residual stress can be reduced when the rigid substrate and the plastic substrate are separated, and thereby components of the flexible electronic paper display apparatus can be prevented from being damaged. Moreover, the stainless steel layer is designed to further prevent the flexible electronic paper display apparatus from being damaged in reliability test. Therefore, the flexible electronic paper display apparatus and the manufacturing method thereof can promote production yield and reliability of the flexible electronic paper display apparatus.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A flexible electronic paper display apparatus, separated from a rigid substrate, comprising:
    a drive substrate comprising:
        a plastic substrate;
        a stainless steel layer disposed on the plastic substrate;
        an insulation layer disposed on the stainless steel layer;
        a circuit unit disposed on the insulation layer; and
    a display layer disposed on the drive substrate,
    wherein before the plastic substrate is separated from the rigid substrate, an area of a bearing surface of the stainless steel layer is smaller than an area of a bearing surface of the rigid substrate, and alignment marks are formed on a region of the rigid substrate which is not overlapped by the stainless steel layer.

2. The flexible electronic paper display apparatus according to claim 1, further comprising at least one adhesive layer disposed between the plastic substrate and the stainless steel layer and/or disposed between the stainless steel layer and the insulation layer.

3. The flexible electronic paper display apparatus according to claim 1, wherein the display layer is an electrophoretic layer, an electro-wetting layer, a quick response liquid powder display layer, or a cholesteric liquid crystal layer.

4. The flexible electronic paper display apparatus according to claim 1, further comprising a protecting layer disposed on the display layer.

5. The flexible electronic paper display apparatus according to claim 1, further comprising a color filter disposed on the display layer.

6. The flexible electronic paper display apparatus according to claim 5, further comprising a protecting layer disposed on the color filter.

7. The flexible electronic paper display apparatus according to claim 1, wherein the circuit unit comprises an active element array.

8. A manufacturing method of flexible electronic paper display apparatus comprising:
    providing a rigid substrate;
    forming a plastic substrate on the rigid substrate;
    forming a stainless steel layer on the plastic substrate, an area of a bearing surface of the stainless steel layer being smaller than an area of a bearing surface of the rigid substrate, and alignment marks used for alignment in following processes being formed on a region of the rigid substrate which is not overlapped by the stainless steel layer;
    forming an insulation layer on the stainless steel layer;
    forming a circuit unit on the insulation layer;
    disposing a display layer on the circuit unit; and
    separating the rigid substrate and the plastic substrate.

9. The manufacturing method of flexible electronic paper display apparatus according to claim 8, wherein the stainless steel layer is adhered to the plastic substrate.

10. The manufacturing method of flexible electronic paper display apparatus according to claim 8, wherein the insulation layer is adhered to the stainless steel layer.

11. The manufacturing method of flexible electronic paper display apparatus according to claim 8, further comprising disposing a protecting layer on the display layer before separating the rigid substrate and the plastic substrate.

12. The manufacturing method of flexible electronic paper display apparatus according to claim 8, further comprising disposing a color filter on the display layer before separating the rigid substrate and the plastic substrate.

13. The manufacturing method of flexible electronic paper display apparatus according to claim 12, further comprising disposing a protecting layer on the color filter before separating the rigid substrate and the plastic substrate.

14. The manufacturing method of flexible electronic paper display apparatus according to claim 8, wherein the plastic substrate and stainless steel layer constitute a bearing base, and distortion of the plastic substrate is reduced when the rigid substrate and the plastic substrate are separated.

* * * * *